Feb. 2, 1971   J. R. BROWN ET AL   3,559,433
LEAD BENDING DEVICE
Filed Aug. 10, 1967

INVENTORS
JAMES R. BROWN
WILLIAM F. LUSK

United States Patent Office 3,559,433
Patented Feb. 2, 1971

3,559,433
LEAD BENDING DEVICE
James R. Brown, 5122 Flintridge Drive, Hyattsville, Md. 20784, and William F. Lusk 9917 Dolby Ave., Glenn Dale, Md. 20769
Filed Aug. 10, 1967, Ser. No. 659,733
Int. Cl. B21f 27/14
U.S. Cl. 72—36                                       5 Claims

ABSTRACT OF THE DISCLOSURE

A gauge for measuring and bending strands of material into desired lengths comprised of simple component parts for measuring and bending the strands to a desired length.

BACKGROUND OF THE INVENTION

The present invention relates to a gauge which is simple in construction, accurate and efficient and which will fill the need in the electronic industry for bending the leads of capacitors, resistors, diodes and the like at desired lengths to facilitate the mounting of the same with respect to structural supports. Heretofore, no simple device has been supplied in the art which will fill this need.

The art is aware of devices for accomplishing the same end result, but these devices generally include adjustable measuring probes which require manipulation in order to determine the distance between mounting points wherein the component is to be located, and additional means for supporting the lead of the component on or in the device for accurately bending the leads thereof.

The device as disclosed hereinafter provides a gauge which will permit virtually a one step operation wherein the leads can be associated directly with the gauge, measured and bent to the correct length and thereafter be mounted onto the structural supports.

SUMMARY OF THE INVENTION

The invention provides a base support member adapted to slidably receive a gauge member therein provided with indicia thereon and wire receiving portions of different diameters in which leads of varying size may be received for bending of the same.

DESCRIPTION OF THE PREFERRED EMBODIMENTS

Figures 1, 2:
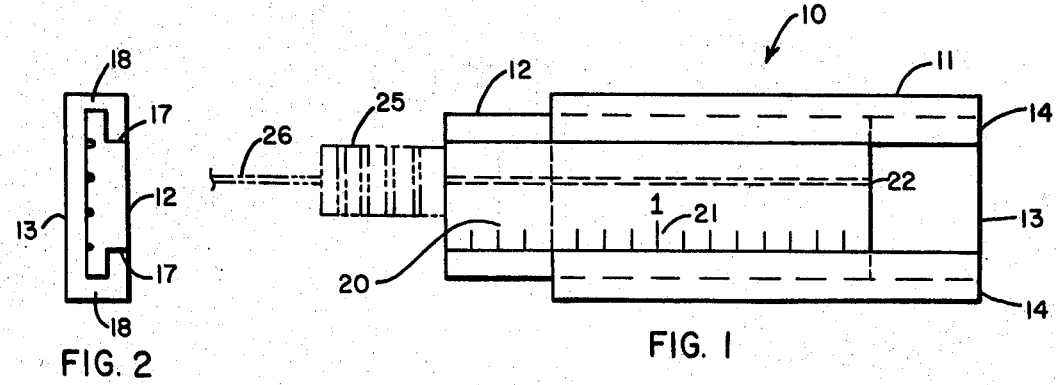
FIG. 1 is a top view of the gauge illustrating the support member with the slidable member receiving a lead from an electrical component.
FIG. 2 is an end view thereof.

Referring to the drawings, and in particular FIGS. 1 to 4, attention is directed first to FIG. 1 wherein the numeral 10 designates the novel gauge of the present invention which is comprised of a base member 11 and a slidable gauge member 12. The base member 11 includes a substantially rectangular plate 13 having upstanding, inverted L-shaped legs 14 extending the length of the plate 13. As is clearly seen in FIG. 4, the legs 14 are integrally formed with the surface 13 as at 15; however, and if it is desired, it is well within the purview of the present disclosure to provide separate legs and to join the same to the surface 13 in any known fashion, for example, as by adhesive or by mechanical fasteners or by a combination thereof. The base 16 of the L-shaped legs 14 extends inwardly toward the center of the plate 13 and defines horizontally spaced vertical surfaces 17 while the vertical components 18 of the L-shaped legs define horizontally spaced vertical surfaces disposed inwardly of the aforementioned surfaces 17, as is readily seen in FIG. 2.

The slidable member 12, as is illustrated in all views, is complementary in shape to that of the base 11 and is itself formed of a generally rectangular base section 19 having a second, generally rectangular, inwardly superimposed section 20 formed integrally with the base section 19. Again, it is considered to be within the scope of the disclosure to form each of the sections 19 and 20 as separate parts and to join them in a manner as mentioned above with regard to the base member. The fit between the base 11 and the member 12 must be such that the latter will slide freely relative thereto, but be frictionally maintained in any of its measuring positions.

Figure 3:
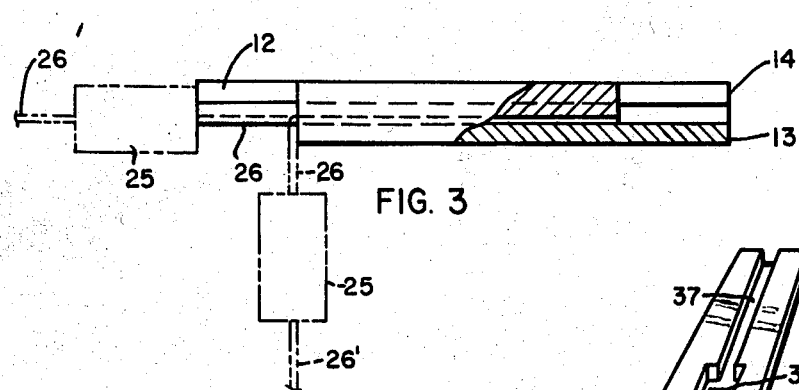
FIG. 3 is a side view of FIG. 1, with portions removed, illustrating the lead of the electrical component in a bent and unbent position.
Figures 4, 5:
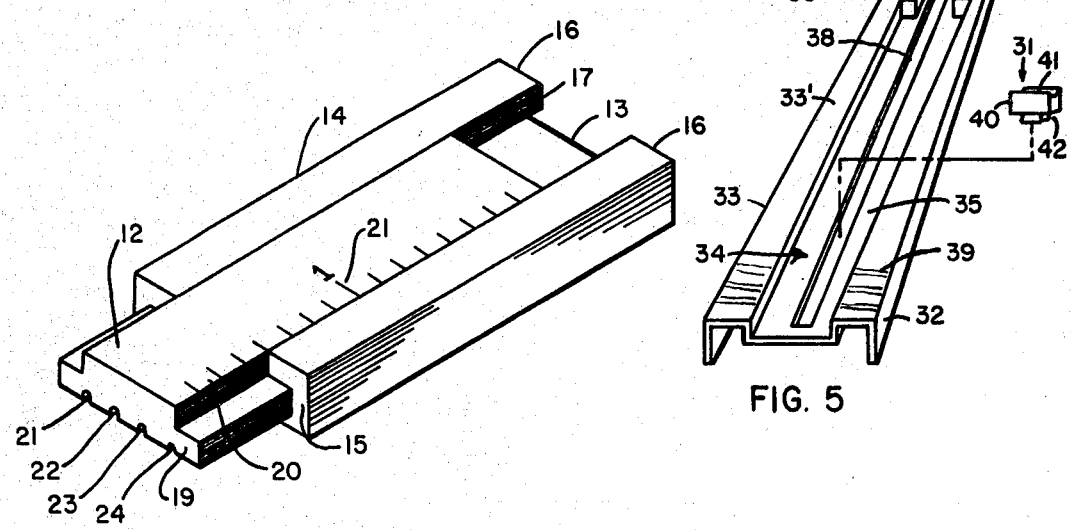
FIG. 4 is a perspective view of the gauge.
FIG. 5 is a perspective view of a second embodiment of the invention.

Referring to FIGS. 2, 3 and 4, it will be seen that the base section 19 is provided with spaced openings 21, 22, 23 and 24. These openings are substantially circular in cross-section having different diameters in order to receive leads of different circumferences and therefore lend versatility to the gauge in that leads of various sizes and different electrical components may be readily received for the purpose of bending them. It is apparent that the aforementioned openings may be made of any suitable configuration to accommodate the leads. The openings 21, 22, 23 and 24 extend the length of the slidable member 12, as shown at 22' in dotted outline in FIG. 1.

Indicia is provided on the top surface of section 20 and the markings thereof are of standard inch dimensions but the markings may be varied to accommodate the user's need.

To use the device as shown in FIGS. 1–4, the operator utilizing the indicia on the slidable gauge, will measure the distance between the mounting points to which the known electronic component is to be located, and may then refer to a chart or other printed information which will relate the length of the body of the component which is to be inserted and he will subtract this known length from the measured distance. The difference is then divided in half and the slidable member 12 is extended this distance with respect to the base, whereupon the lead 26 of the component 25 is inserted into the appropriate-sized hole as shown in FIG. 1. After insertion of the lead, the operator engages the body 25 and bends it to the dotted line position of FIG. 3. The operator then repeats the procedure for lead 26', and after this operation will mount the leads, with respect to the structural support. It is to be noted that with the present gauge, the main body of the electrical component may be evenly spaced between the mounting points due to the fact that the leads are always bent with respect to the body end portions of the component.

A second embodiment of the invention is disclosed in FIG. 5, wherein the component parts are comprised of a base designated generally at 30 and a component support attachment 31. The base 30 is comprised of an elongated member defined by tapering sides 32, 33 and planar surface 33'. The planar surface 33' is provided with a cut out or recessed area 34 extending the length thereof. The portion 34 is comprised of a plurality of staggered, widthwise decreasing portions 35, 36 37 positioned between the ends of the base. A slot 38 is disposed with the portions 35, 36 and receives the component supporting attachment 31, in a manner as depicted by the broken line, for sliding engagement therewith.

The face 33 of support 30 is provided with a plurality of horizontally spaced pairs of cooperating grooves 39 which are of a size to receive the leads of a component such as illustrated at 26, 26′ when the body of the component is disposed widthwise within the area 34.

The attachment 31 includes a main body 40 having a depressed area 41 shaped to cooperate with the outline of the body component for readily supporting the same. A slot-engaging tab 42 is disposed beneath the main body 40 for removably securing the same with respect to the slot 38.

A plurality of attachments 31 are furnished with the base member for accommodating components of varying sizes, and each are accordingly marked to designate the particular size. Additionally, indicia may be placed on the support member to facilitate the use of the same.

In use, and with the component support disposed within the slot, the assembler either measures of slides the base between the mounting points, for the component, and slides the attachment 31 to the appropriate position within the slot 38, whereupon he places the body component within the recess 41 and the leads into the selected pairs of grooves 39. The ends of the leads are grasped and bent against the surfaces 32, 33 to provide a rightangled relationship with respect to the component 25 whereupon the same is ready to be mounted with respect to its support.

Alternatively, the size of the component and the dimension to which the leads are required to be bent may be such that the body of the component can be positioned within the area 37 and the leads bent in a fashion as discussed above without using the attachment 31.

It is to be understood that the forms of the invention herewith shown and described are to be taken as preferred examples of the same, and that various changes in the shape, size and arrangement of parts may be resorted to, without departing from the spirit of the invention or scope of the subjoined claims.

We claim:

1. A device for bending leads of an electrical component for disposing the same between two spaced mounting points, comprising at least a first member, at least a second member, means on one of said members adjustably receiving said other member, indicating means on at least one of said members facilitating the distance to which one of said members is moved relative to the other wherein said distance is directly related to the distance between said mounting points, means on said first and second members cooperating with one another for supporting at least one of said leads and defining a surface against which said lead can be bent after said relative movement between said members, and wherein one of said members is a support including a planar surface tapering from one end to the other and the other member is defined by a surface supporting said electrical component.

2. The device of claim 1 wherein the cooperating means comprises spaced pairs of lead supporting members disposed on said planar surface and said last-mentioned surface is shaped to substantially complement the shape of the electrical component.

3. The device of claim 1 wherein the adjustable receiving means includes a slot in one of said members receiving a depending tab means on said other member.

4. The device of claim 1 wherein the indicating means is comprised of indicia placed on one of said members.

5. A device for bending leads of an electrical componet for disposing the same between two spaced mounting points, comprising a first elongated member generally "U"-shaped in cross-section defining spaced end surfaces and an internal surface extending lengthwise thereof, a second elongated member defining spaced end surfaces and a complementary lengthwise surface generally rectangular in cross-section cooperting with said internal surface whereby the same is received and telescopingly supported thereon, said end surfaces of each of said members being substantially perpendicular to their respective lengthwise surfaces, indicating means on at least one of said members facilitating the distance to which one of said members is moved relative to the other wherein said distance is directly related to the distance between said mounting points, and means on said first and second members cooperating with one another for supporting only one of said leads and permitting said lead to be bent against one of said end surfaces of said first member after said second member is moved outwardly relative to the first member, said last mentioned means including at least one component lead receiving opening formed in said second elongated member and extending from one end surface to the other whereby when a lead is positioned therein it will be partially supported on said internal surface of said first member and subsequently bent against the end surface thereof adjacent to the outward movement of the second member.

References Cited

UNITED STATES PATENTS

| | | | |
|---|---|---|---|
| 3,142,484 | 7/1964 | Press | 72—476 |
| 3,151,398 | 10/1964 | Torrey | 72—36X |
| 3,212,368 | 10/1965 | Hutchinson et al. | 140—123X |
| 2,800,818 | 7/7957 | Larson | 72—458 |
| 3,289,446 | 12/1966 | Davey | 72—36 |

MILTON S. MEHR, Primary Examiner

U.S. Cl. X.R.

72—476; 140—123